N. Russell.
Earth-Conveyer.
Nº 72544. Patented Dec. 24, 1867.
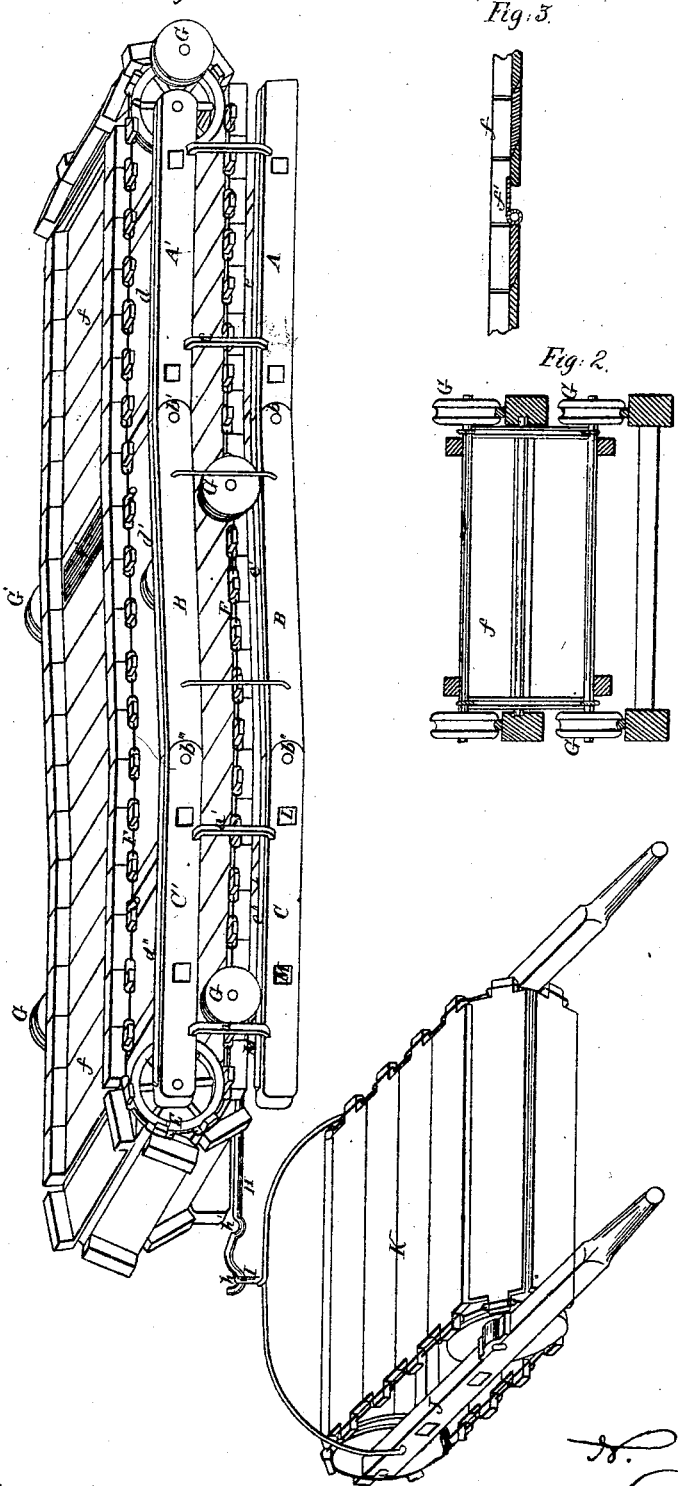
Attest.
Oscar Hall
Fred Bachrens
Inventor:
N. Russell
By Knight Bros
Attys

United States Patent Office.

NIRAM RUSSELL, OF HARRISON, OHIO.

Letters Patent No. 72,544, dated December 24, 1867.

IMPROVEMENT IN EARTH-CONVEYERS.

*The Schedule referred to in these Letters Patent and making part of the same.*

TO WHOM IT MAY CONCERN:

Be it known that I, NIRAM RUSSELL, of Harrison, Hamilton county, Ohio, have invented a certain new and useful Earth-Conveyer; and I hereby declare the following to be a full, clear, and exact description thereof, reference being had to the accompanying drawings, making part of this specification.

My invention relates to an earth-conveyer adapted to be used in excavating-operations, the conveyer being so arranged as to deliver the dirt, sand, &c., taken from the cutting, into cars or wagons, which may be situated either above or below the level of the "cutting." In the accompanying drawings—

Figure 1 is a side elevation of a conveyer embodying my improvements.

Figure 2 is a transverse section of the main part of the same.

Figure 3 shows a metallic flap to allow the escape of any dirt from the inside of the conveyer.

A A', B B', and C C', represent the main frame, of three sections, which supports the conveyer, and the frames A A' and C C' are connected together and held securely in position by the stanchions $a$ $a'$ and $c$ $c'$, whilst the two other frames B B' are pivoted to the inner ends of A A' and C C' by the bolts $b$ $b'$ $b''$ $b'''$. The central section being thus pivoted to the two outer ones, enables either end of the frame to be elevated or depressed, so as to deliver the sand, &c., either above or below the level of the cutting. Journalled in the outer ends of the beams A' and C' are two drums, D and E, around which passes a chain, F, to which is attached a series of slats, $f$ $f$, thus forming an endless carrier upon which the earth is conveyed away from the excavation. The endless carrier is supported at suitable distances by the rollers G, which run upon the upper tracks, $d$ $d'$ $d''$, and the lower ones, $e$ $e'$ $e''$. Upon the carrier is a hinged flap, $f'$, of metal, which swings open once in every revolution of the carrier, and allows any dirt which may have collected inside the slats to drop out, the said flap gravitating again to a closed position. The outer end of the beam C is provided with an adjustable bearing-bar H, having two depressions $h$ $h'$, and said bearing-bar has connected to it by the hook I a frame, J, which supports an endless carrier, K, constructed similarly to the upper carrier F $f$. The carrier K is propelled by the sand, &c., which falls upon it from the upper carrier F, and this frame can be so arranged as to deliver the sand into either compartment of a car, by simply causing the hook I to engage with either of the depressions $h$ or $h'$ of the bearing-bar H. The said bar H is pivoted in the cross-piece L, and rests in one of several notches in the upper side of the cross-piece M, thus admitting of a lateral adjustment by moving from one notch to another. The upper carrier F can be propelled by either hand, horse, steam, or any other convenient power, and the frame of the conveyer can be made in any number of sections.

I claim herein as new and of my invention—

1. The arrangement of the jointed frame A A', B B', C C', endless carrier $f$, and pivoted flap $f'$, as herein described and for the purposes set forth.

2. In combination with the above parts, I claim the adjustable bar H, and adjustable carrier K, as and for the purpose set forth.

In testimony of which invention, I hereunto set my hand.

<div style="text-align:right">
his<br>
NIRAM × RUSSELL.<br>
mark.
</div>

Witnesses:
SAMUEL KNIGHT,
JAMES H. LAYMAN.